US007406682B2

(12) United States Patent
Todd et al.

(10) Patent No.: US 7,406,682 B2
(45) Date of Patent: Jul. 29, 2008

(54) TRANSLATOR-COMPILER FOR CONVERTING LEGACY MANAGEMENT SOFTWARE

(75) Inventors: Stephen J. Todd, Shrewsbury, MA (US); Andreas L. Bauer, Maynard, MA (US)

(73) Assignee: EMC Corporation, Hopkinton, MA (US)

( * ) Notice: Subject to any disclaimer, the term of this patent is extended or adjusted under 35 U.S.C. 154(b) by 798 days.

(21) Appl. No.: 09/817,437

(22) Filed: Mar. 26, 2001

(65) Prior Publication Data
US 2004/0015889 A1    Jan. 22, 2004

(51) Int. Cl.
*G06F 9/45* (2006.01)

(52) U.S. Cl. .................. 717/137; 717/120; 717/143

(58) Field of Classification Search ........ 717/136–144, 717/117, 152, 164, 104–116, 120–123; 703/26, 703/23; 714/4, 6; 712/222, 41; 707/100, 707/101; 709/223, 219; 704/9; 716/3; 719/310

See application file for complete search history.

(56) References Cited

U.S. PATENT DOCUMENTS

| | | | | |
|---|---|---|---|---|
| 4,992,934 A | * | 2/1991 | Portanova et al. | 712/209 |
| 5,119,465 A | * | 6/1992 | Jack et al. | 717/137 |
| 5,133,072 A | * | 7/1992 | Buzbee | 717/152 |
| 5,197,138 A | * | 3/1993 | Hobbs et al. | 712/222 |
| 5,291,583 A | * | 3/1994 | Bapat | 717/137 |
| 5,307,504 A | * | 4/1994 | Robinson et al. | 712/41 |
| 5,339,422 A | * | 8/1994 | Brender et al. | 714/4 |
| 5,477,451 A | * | 12/1995 | Brown et al. | 704/9 |
| 5,488,714 A | * | 1/1996 | Skidmore | 717/143 |
| 5,551,015 A | * | 8/1996 | Goettelmann et al. | 717/137 |
| 5,650,948 A | * | 7/1997 | Gafter | 716/3 |
| 5,666,296 A | * | 9/1997 | Gafter | 716/3 |
| 5,764,991 A | * | 6/1998 | Carcerano | 717/140 |
| 5,878,422 A | * | 3/1999 | Roth et al. | 707/100 |
| 5,905,892 A | * | 5/1999 | Nielsen et al. | 717/145 |
| 5,960,169 A | * | 9/1999 | Styczinski | 714/6 |
| 5,960,200 A | * | 9/1999 | Eager et al. | 717/147 |
| 6,086,622 A | * | 7/2000 | Abe et al. | 703/26 |

(Continued)

OTHER PUBLICATIONS

Distributed Management Task Force, Inc. (DMTF), Common Information Model (CIM) Specification Version 2.2, Jun. 14.*

(Continued)

*Primary Examiner*—Ted T. Vo
(74) *Attorney, Agent, or Firm*—Krishnendu Gupta; Joel Wall; Robert Kevin Perkins

(57) ABSTRACT

A translator-compiler for converting legacy architecture. In the area of management software or distributed management software, a standard architecture is evolving from legacy or proprietary architecture, and the standard embraces CIM/XML (Common Information Model/eXtensible Markup Language) computer language. Many vendors have developed proprietary languages for their respective management products that are incompatible with such standard. To accomplish compatibility between standard architecture and various different proprietary architectures, a substantial amount of code must be written at great effort and expense, unless an automatic, easily-applied and universal solution can be achieved. A translator-compiler is disclosed which meets these solution criteria and therefore solves this incompatibility problem. Flowcharts depicting algorithms along with sample input and output code in C++, as well as an example of the final XML result are also disclosed. Particular detail is disclosed with regard to storage management software aspects, although embodiments of the present invention are also operable with printer, server and other functional-component management software.

83 Claims, 5 Drawing Sheets

U.S. PATENT DOCUMENTS

| | | | | |
|---|---|---|---|---|
| 6,154,853 | A * | 11/2000 | Kedem | 714/6 |
| 6,408,299 | B1 * | 6/2002 | Weerawarana et al. | 707/101 |
| 6,425,118 | B1 * | 7/2002 | Molloy et al. | 717/136 |
| 6,453,464 | B1 * | 9/2002 | Sullivan | 717/137 |
| 6,480,891 | B1 * | 11/2002 | Chernyak et al. | 709/223 |
| 6,523,172 | B1 * | 2/2003 | Martinez-Guerra et al. | 717/143 |
| 6,571,282 | B1 * | 5/2003 | Bowman-Amuah | 709/219 |
| 6,625,617 | B2 * | 9/2003 | Yarnall et al. | 707/104.1 |
| 6,643,759 | B2 * | 11/2003 | Andersson et al. | 711/207 |
| 6,738,975 | B1 * | 5/2004 | Yee et al. | 719/310 |
| 6,820,252 | B2 * | 11/2004 | Sakamoto et al. | 717/136 |
| 6,901,588 | B1 * | 5/2005 | Krapf et al. | 717/164 |
| 2002/0066085 | A1 * | 5/2002 | Nowlin, Jr. et al. | 717/137 |
| 2002/0092002 | A1 * | 7/2002 | Babaian et al. | 717/137 |
| 2003/0167455 | A1 * | 9/2003 | Iborra et al. | 717/105 |

OTHER PUBLICATIONS

Distributed Management Task Force, Inc. (DMTF), Specification for CIM Operations of HTTP Version 1.0, dated Aug. 11, 1999.*

Treehouse Software Inc., "Tree Tips", www.treehouse.com, pp. 1-8, May 2000.*

Data Conversion Laboratory, "Migration Your Content without A Hitch . . . ," www.DCLab.com, pp. 1-4, Jun. 14, 2005.*

Data Conversion Laboratory, "Getting your content into XML; A management perspective," www.DCLab.com, pp. 1-12, Jun. 14, 2005.*

Distributed Management Task Force Inc., "Common Information Model (CIM) Specification", www.dmtf.org, Version 2.2, Jun. 1999.*

Distributed Management Task Force Inc., "Specification for CIM Operations over HTTP", www.dmtf.org, Version 1.0, Aug. 1999.*

Treehouse Software Inc., "Tree Tips", www.treehouse, pp. 1-8, May 2000.*

Data Conversion Laboratory, "Migration Your Content without A Hitch . . . ", wwwDCLab.com, pp. 1-4, dated: Jun. 14, 2005.*

Data Conversion Laboratory, "Getting Your Content Into XML; A Management Perspective", wwwDCLab.com, pp. 1-12, dated Jun. 14, 2005.*

Chen et al., "A C++ Data Model Supporting Reachability Analysis and Dead Code Detection", IEEE, pp. 682-693, Sep. 1998.*

Chen et al., "Ciao: A Graphical Navigator for Software and Document Repositories", IEEE, pp. 66-75, 1995.*

Podmore et al., "Common Information Model—A Developer's Perspective", IEEE, pp. 1-6, 1999.*

DMTF, "Common Information Model (CIM) Specification", Distributed Management Task Force Inc., Version 2.2, Jun. 1999.*

Hammer et al., "Information Translation, Mediation, and Mosaic-Based Browsing in the TSIMMIS System", SIGMOD Demo Proposal, CiteSeer, pp. 1-5, 1995.*

* cited by examiner

LEGACY ARCHITECTURE EXAMPLE

CIM/XML ARCHITECTURE

ALTERNATIVE
EMBODIMENT

TRANSLATOR-COMPILER FOR CONVERTING LEGACY MANAGEMENT SOFTWARE

BACKGROUND OF THE INVENTION

1. Field of the Invention

The present invention relates generally to management software, and, more particularly, relates to converting legacy or proprietary management software into software compatible with new industry-standard architecture.

2. Description of Prior Art

To say that growth of the computer industry has been rapid is something of an understatement. Computer companies develop and market (1) hardware such as mainframes, personal computers, peripherals including storage systems, printers, terminals and modems; (2) software which runs on and controls that hardware such as operating systems software and applications software such as peripheral-device management software; and, (3) networking infrastructure, such as the Internet, employing this hardware and software. As noticed by many, this industry is a powerful engine pulling civilization forward in an almost uncomfortably rapid manner.

Because of constant, intense and competitive technological design enhancement activity inherent in this industry, different, and frequently incompatible, technical designs are created. Such incompatibility can result in difficult situations, as, for example, where a corporate user of this technology utilizes, for example, different storage systems each having architecture incompatible with the others, internal to its own organization. In this circumstance, each storage system vendor has produced its own proprietary or "legacy" architecture and supplied same to this corporate-customer user who now has the challenge of managing or handling such incompatibility in as efficient and graceful a manner as possible. Regrettably, one storage system management software package cannot readily communicate with a different vendor's storage system management software package within the same corporate environment, without arduous code generation to close the communication gap! Thus, this corporate user, unfortunately, is now burdened with meeting this challenge including the taking of redundant actions. Such actions are, for example, providing multiple training sessions to its employees, so they can describe and handle failures, degradations and other complications which may arise in these incompatible storage systems, in as many different languages as are dictated by such different legacy or proprietary architectures defining such systems. This confusing and inefficient scenario results from an availability of too many different kinds of management tools and places an unwanted drain on this corporate user's resources. Accordingly, computer industry vendors have created standards committees and organizations in which their companies can be represented, for purposes of interacting and generating standards of design for the good of all concerned, including corporate-customer users as exemplified above.

Thus, one technical area where need for standardization is apparent is in the computer storage-system management arena where certain storage-management software products are based on older, less-desirable, or increasingly-incompatible legacy or proprietary architectures. These architectures are combinations of software such as schemas, languages and protocols, etc. For example, referring to FIG. 2A, one such legacy architecture hierarchy is depicted: at the bottom of the architecture stack are protocols: TCP/IP (Transmission Control Protocol/Internet Protocol), Sockets, and Rogue Wave (Net.H++). On top of those protocols, in this example, is object-oriented computer language C++. And on top of that computer language is a schema (header-related software and further defined hereinbelow) such as that derived from or implemented in RAID++. RAID++ is an object-oriented representation of a CLARiiON® storage system (registered trademark of assignee) in C++ language, and objects are defined below.

Legacy architecture such as that comprising TCP/IP, Sockets, Rogue Wave and schemas is fundamental to the design of networks such as, for example, a client-server network. In a client-server network, several communication aspects need to be specified: (1) How does the client communicate with the server? TCP/IP over an ethernet cable would be responsive to this question. (2) What language will be used by the client and server? Rogue Wave and Sockets are among the answers responsive to this question. (3) What language is the code written in? C++ or JAVA would be examples of languages responsive to this question. (4) What subject will be talked about? Schema would focus the subject to particular subject matter such as, for example, "storage management" as opposed to, for example, "extracting banking information". Thus, legacy architecture defines the client-server network.

Although legacy or proprietary architectures can still be useful under certain circumstances, they are generally no longer the architecture of choice for reasons of incompatibility noted above and for other reasons. For example, it is not unusual for legacy or proprietary architecture to employ C++ language. Such language is typically represented in object "trees" because C++ fits naturally with tree representation, (although C++ can also be represented otherwise). Tree representations have certain analytical-design disadvantages as compared with a flat object representation. Objects, object trees, and an improved "flat" object database representation, all in connection with industry standardization, are described as follows. One industry standardization effort is being conducted by the Distributed Management Task Force, Inc. (DMTF) and is moving in a direction entitled: "Web-Based Enterprise Management" (WBEM). One area being addressed by this effort is within the aforementioned software category known as "object-oriented" software. An object, in computer software terms, is a dedicated area of memory which can be thought of as an impervious container holding both data and instructions within itself, both defining itself and its relationships to other objects in the computer system or network. An object can send and receive messages to and from other objects, respond and react to such messages (e.g. commands) but shall normally be impervious to internal scrutiny. For example, in a storage processor (a kind of computer) each object may describe or relate to a specific detail in the processor (e.g. a fan, power switch, cache memory, power supply, disk drive interface, etc.), where these tangible objects in the storage processor can send messages to each other and to other objects outside the processor.

If operating with C++ computer language, as noted above, the relationship between these specific objects in the storage processor is usually visualized or characterized as a "tree" of objects. In a tree, each such object hangs off a preceding object as if in a parent-child or inheritance relationship, with many children hanging from a parent not being an a typical configuration. In addition to these tangible kinds of objects, logical units (LUNs) are other nodes or objects that can be contained within the tree. If a user wants to know, for example, about all existing LUNs (and there can be a vast number) in a particular tree configuration, any hardware/ software search solution for them is necessarily based on a design which must, in turn, be based on such tree representation. Thus, a search through the entire tree must be conducted to find all LUNs, which can be a cumbersome and time consuming task under certain conditions. Furthermore, even if not searching for LUNs, in order for a search or message transfer to proceed in the tree from one node or object to another, again the entire tree may have to be navigated. When there are thousands or more of these objects in the tree, this could take too much time as a message passes from object to object within the tree. Accordingly, for these and other reasons not relating to performance WBEM is establishing a standard that avoids object trees and arranges all objects in a database where a "flat" relationship is obtained, i.e., objects can communicate from one to the other directly and need not proceed through intermediary objects as required in the tree configuration. Flat-database-represented eXtensive Markup Language (XML) has been selected by WBEM.

XML, in addition to allowing a flat object database where one object can communicate directly with any other object in the database, is a language that offers other advantages with respect to Internet usage. XML is related to or is a superset of Hypertext Markup Language (HTML), and Internet browsers display information in HTML. XML thus enables companies to leverage Web technologies to manage enterprise systems such as storage systems. Therefore, XML is a language of choice in view of its Internet compatibility.

Referring to FIG. 2B, a new architecture stack is shown and is to be compared with the legacy architecture stack of FIG. 2A. In FIG. 2B, the earlier-noted TCP/IP protocol is still at the bottom followed by the aforementioned HTTP protocol, on top of which is the aforementioned XML computer language; and, on top of XML is a new and advantageous schema called Common Information Model (CIM). (A schema can be viewed as a description of a class structure, i.e., the schema enumerates all the classes, how they are related to each other in terms of reference to each other and in terms of parent-child inheritance relationships, maybe including a description of all properties that these classes may have, and maybe further including all methods that can be executed in those classes.) A ninety-seven (97) page specification entitled "Common Information Model (CIM) Specification" Version 2.2, dated Jun. 14, 1999 prepared by the Distributed Management Task Force, Inc. (DMTF) offers more information about this subject and is incorporated by reference herein in its entirety. Another specification of eighty-seven (87) pages entitled "Specification for CIM Operations of HTTP" Version 1.0, dated Aug. 11, 1999, prepared by DMTF likewise provides valuable background information and is also incorporated by reference herein in its entirety. CIM is superior to older, legacy-based schemas in the one respect that it creates interoperability and allows management of different storage systems supplied by different vendors. CIM also has capability of modeling servers, software on servers, power supplies on servers, network switches, tape backup, and virtually all other manageable components in a computer system.

Serious potential effort and expense issues enter into this scenario when considering the huge legacy architecture which has been developed in this industry thus far. There has been major investment on the part of many industry participants (multiple-hundreds of industry vendors) in each of their own respective brands of proprietary or legacy architecture. Such architecture is not only the specific layered architecture shown in FIG. 2A useful with at least CLARiiON® storage systems (registered trademark of assignee), but any legacy architecture including that which is not in conformance with FIG. 2A and different from the proposed standard of FIG. 2B. As industry vendors know, to change one's investment from any legacy architecture, e.g. that represented by FIG. 2A to that of FIG. 2B, is a major undertaking typically requiring the writing of a huge number of lines of code. What is needed for the industry, therefore, for both industry vendors and users alike, is an automatic conversion technique to permit the large investment made by multiple industry participants, regardless of their specific legacy architecture, to be preserved and upgraded to the new standard stack of FIG. 2B, or to any other new standard, automatically and with minor impact on their respective businesses.

Embodiments of the present invention provide a welcome solution to the aforementioned prior art problems. Such embodiments are far easier to implement than the aforementioned line-by-line code upgrade conversion. Moreover, not only do such embodiments relate to and solve specific problems associated with the particular legacy architecture shown in FIG. 2A, but their underlying algorithms can also provide a solution to almost any legacy architecture upgrade challenge.

SUMMARY OF THE INVENTION

Embodiments of the present invention relate to a translator-compiler for converting legacy management software and further relate to permitting communication between a first computer's management software operating in accordance with first or legacy architecture and a second computer's management software operating under second or new-standard, non-legacy architecture.

More specifically, embodiments of the present invention relate to an interface between a first computer network operating in accordance with first architecture and a second computer network operating in accordance with second architecture incompatible with the first architecture, to automatically convert management software communication from the second computer network into a form compatible with the first computer network, and to automatically convert response to the management software communication generated by the first computer network into a form compatible with the second computer network.

Even more specifically, embodiments of the present invention relate to computer systems, computer networks, methods, and computer program products employing management software written in a first computer language compatible with a first architecture such as legacy architecture and not compatible with a second architecture such as preferred, non-legacy architecture. Such legacy architecture contains a schema which, in turn, contain header files represented in the first computer language. Header files are capable of being utilized by the management software. The header files are manipulated to locate certain or all public functions and/or data attributes. Responsive to such manipulation, code is emitted that calls all such public functions and/or data attributes which are converted to representations formed in a different computer language compatible with the preferred non-legacy architecture. Such management software can be storage management software, printer management software, server management software, etc., and embodiments of the present invention are not intended to be limited to any particular management software functionality.

In a further feature of the present invention, the first computer language is an object-oriented language defining computer data and commands as objects. In such an environment, at least one of the header files containing a declaration of at least one of the objects is opened and parsed to obtain the name of the class and of the parent class to which it belongs. A subroutine is created to accept such object(s) in the first computer language and to generate the equivalent of such object(s) in a different computer language compatible with the preferred, non-legacy architecture.

In yet another feature of the present invention the first computer language is an object-oriented language capable of pictorial representation typically in a parent-child tree configuration, such as, for example, C++, or RAID++, and the different computer language is a second object-oriented language capable of pictorial representation typically in a flat database configuration, such as, for example, XML/CIM.

In another aspect, embodiments of the present invention relate to a computer network operating in accordance with legacy architecture, including a client and a storage system (including but not limited to a storage area network—SAN), having management software operating thereon in accordance with such legacy architecture. A translator-compiler creates code that permits communication between the computer network and other devices outside of the network operating under preferred, non-legacy architecture. Program code accesses and parses such management software's header files located within a schema, opens an output file to store related information and results, locates certain or all public data attributes and/or public functions within the header file, and emits special code to the output file that calls such public data attributes and/or public functions and converts them to language compatible with said preferred, non-legacy architecture. Thereby, communication about managing the storage system, generated between the computer network including the storage system on the one hand, and devices operating under non-legacy architecture outside the computer network on the other hand, is achieved. Further, this communication is achieved without having to completely abandon any investment made in the proprietary implementation.

In yet another aspect, embodiments of the present invention relate to computer program product such as distributed management software to be operated on a computer compatible with certain architecture. First requests in first language(s) incompatible with the certain architecture are received. Responses to the first requests are obtained in second language compatible with the certain architecture. And, the responses are converted to equivalent responses compatible with the first language and are communicated to the destination from which, or to another destination related to that destination from which, the first requests originated. A related destination can be either the destination from which the requests originated or can be that specified or determined by information in such requests. Distributed management software can be, e.g., storage management software. And, the first language(s) can be a plurality of languages each being incompatible with the second language, in which case the responses are converted to a like plurality of equivalent responses each being constructed in one of the plurality of languages and destined for its like—language source. In this case, the second language is compatible with legacy or proprietary architecture, and the first languages are compatible with a plurality of preferred, non-legacy architectures.

It is thus advantageous to utilize embodiments of the present invention in situations where computer systems or networks including their management software designed in accordance with legacy architecture would otherwise be usefully employed in communicating with other systems or networks including their other management software designed in accordance with other preferred, non-legacy architecture.

It is therefore a general object of the present invention to provide an improved computer program product to be operated on a computer system or within a computer network.

It is still yet another general object of the present invention to provide an interface between two architecturally-incompatible networks to automatically convert otherwise incompatible management software communication therebetween to compatible management software communication.

It is a further object of the present invention to provide a translator-compiler for converting legacy management software compatible with legacy or proprietary architecture to compatibility with preferred, standard, non-legacy architecture.

It is a still further object of the present invention to provide a translator-compiler to make storage, printer, server or other-component management software employed on, in or with computer systems, computer networks, computer methods, and computer program products written in a first computer language which is compatible with legacy architecture, to be automatically compatible with otherwise-incompatible new or different management software compatible with preferred, non-legacy architecture.

Other objects and advantages will be understood after referring to the detailed description of the preferred embodiments and to the appended drawings wherein:

DESCRIPTION OF THE PREFERRED EMBODIMENTS

Figure 1:
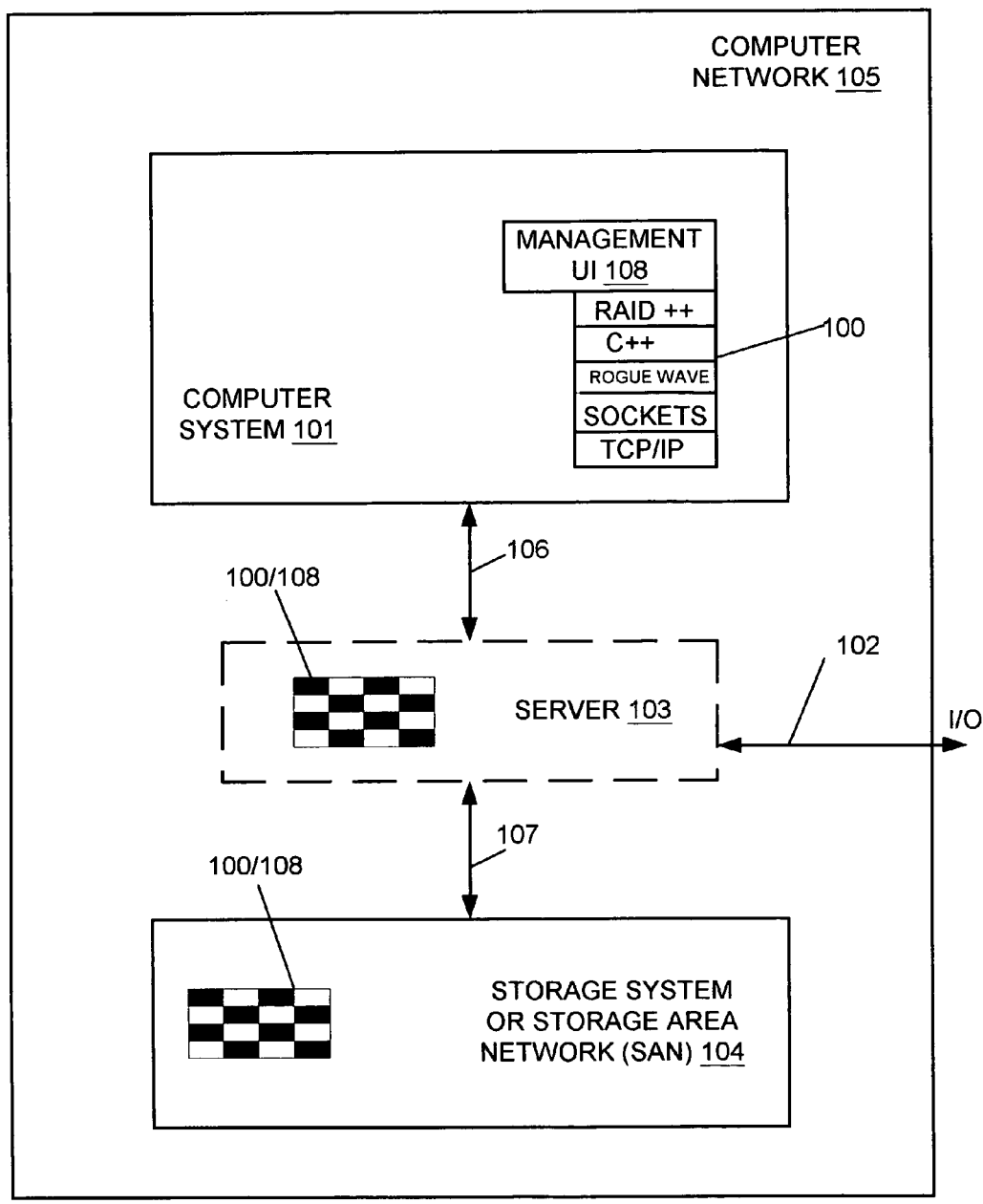
FIG. 1 is a block diagram of a computer network, suggesting its basis on legacy architecture, and therefore a network of the type in which embodiments of the present invention can be utilized.

FIG. 1—Computer Network

Figure 2A:
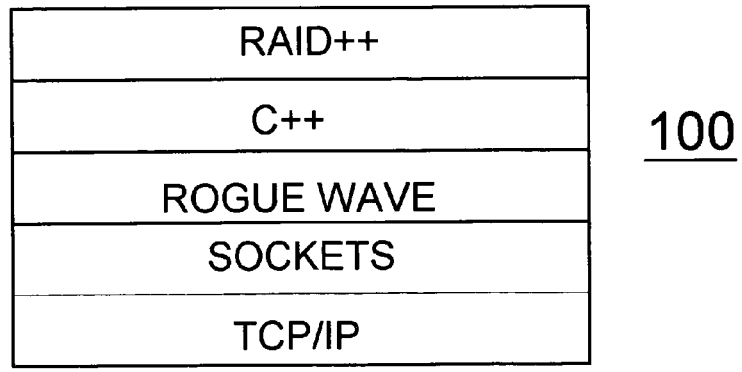
FIG. 2A is a schematic representation of one legacy architecture.
Figure 2B:
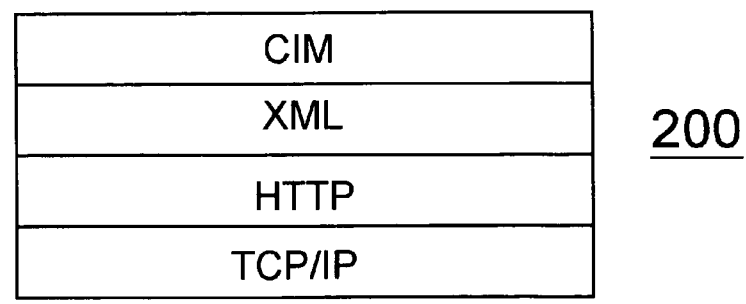
FIG. 2B is a schematic representation of an example of standard, non-legacy architecture.

Referring to FIG. 1, there is presented a block diagram of a computer network, with an indication of its basis in or on legacy architecture, and is therefore a network of the type in which embodiments of the present invention can be advantageously utilized. Computer network 105 is shown containing client or head-station computer system 101. Computer system 101 is designed and built in accordance with legacy architecture (intended to be suggested in FIG. 1 by block 100 and shown schematically in FIG. 2A). Management user interface software 108 (such as proprietary NAVISPHERE® software, a registered trademark of assignee) can run on top of such legacy architecture. Such architecture and proprietary management software is deployed throughout computer network 105 as suggested by blocks 100/108 appearing in server 103 and storage system or storage area network (SAN) 104. Server 103 is a dedicated computer operating between client computer system 101 and SAN 104 via bi-directional busses 106 and 107 for purposes of serving its client relative to such SAN. Other network configurations may not need such a server where the connection between client computer system 101 and SAN 104 would be direct; server 103 is shown in dashed line format to indicate its absence in those other configurations. Management software 108, distributed as shown throughout the network, manages at least storage system or SAN 104. I/O bus 102 is shown operatively coupled to server 103 and connects network 105 to other networks (not shown). I/O bus 102 could alternatively be operatively coupled directly to storage system or SAN 104 instead, or in absence, of server 103. In particular, I/O bus 102 can serve as a connection to other management software used in such other networks. As noted, it is with this kind of network configuration based on legacy architecture that embodiments of the present invention are particularly useful.

Figure 3:
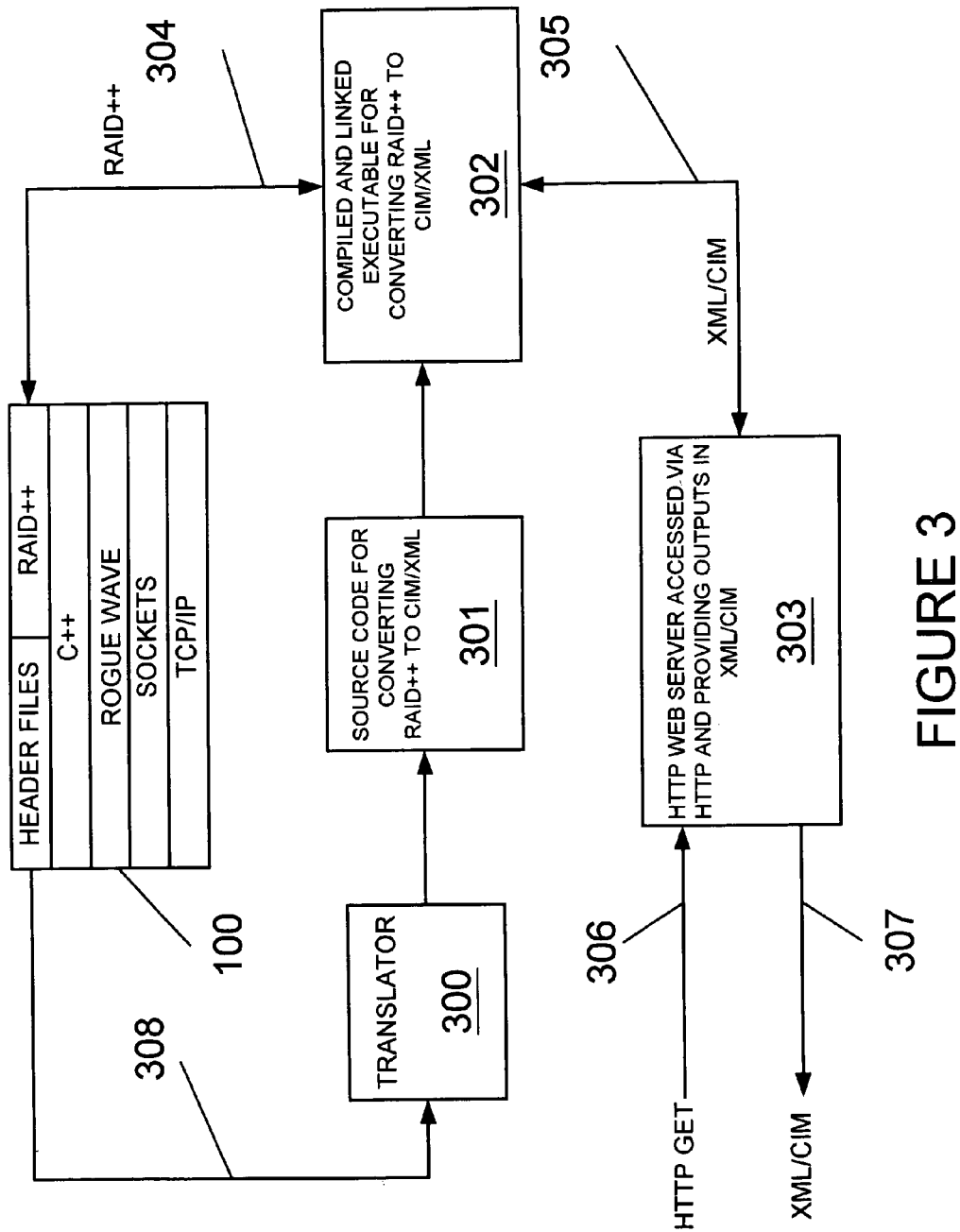
FIG. 3 is a schematic diagram reflecting usage of embodiments of the present invention with the legacy architecture.

FIG. 3—Schematic Diagram

Referring next to FIG. 3, a schematic diagram reflecting usage of embodiments of the present invention with legacy architecture is presented. This particular example involves RAID++, which is derived from and related to C++ object-oriented language. It should be understood that the present invention is not limited to usage with RAID++, C++, or any other language. Legacy Architecture stack 100 is shown and built bottom-up as follows: TCP/IP, Sockets, Rogue Wave, C++, and RAID++. RAID++ is shown divided into its header and data files for convenience of explanation hereinbelow.

In an overview of operation of a particular embodiment of the present invention, these header files are input, in source code format, to translator 300 over bus 308 where they are manipulated to locate certain or all public functions and/or data attributes of the header files as detailed in discussion of FIG. 4 hereinbelow. Output of translator 300, (more detail provided about translator 300 in connection with discussion of algorithms depicted in flowcharts in succeeding figures), is emitted to, or poured-into, file(s) in block 301, shown as source code files for converting RAID++ to C Such translator output source code (a translated-form of RAID++ headers) is forwarded from block 301 to block 302 where it is compiled into machine language (binary Is and Os) and linked with RAID++ machine language obtained over bidirectional bus 304. These two combined and linked machine languages form an executable program capable of converting RAID++ to CIM/XML. In this example, need for communication in XML/CIM, which is the same language as CIM/L, is presented by way of an Internet requirement—HTTP web server 303 is accessed and needs to provide outputs in XML/CIM. An HTTP GET command, for example, may appear over bus 306, as when a user requests access to a particular Internet address. Such command is processed in server block 303 in XML/CIM language, forwarded over bidirectional bus 305 to block 302. The executable program in block 302 has the ability to accept requests in CIM language, such as this request, then query RAID++ over bidirectional bus 304, then obtain a result in RAID++, then convert such result into CIM/XML, and then return that result to block 303. Block 303 transmits such result, with any needed buffering and processing done by web server 303, over output bus 307 to the destination from which, or related to that destination from which, the request arrived on input bus 306. Input and output busses 306 and 307 may thus be equivalent to I/O bus 102 in FIG. 1.

FIG. 4—Flowchart

Figure 4:
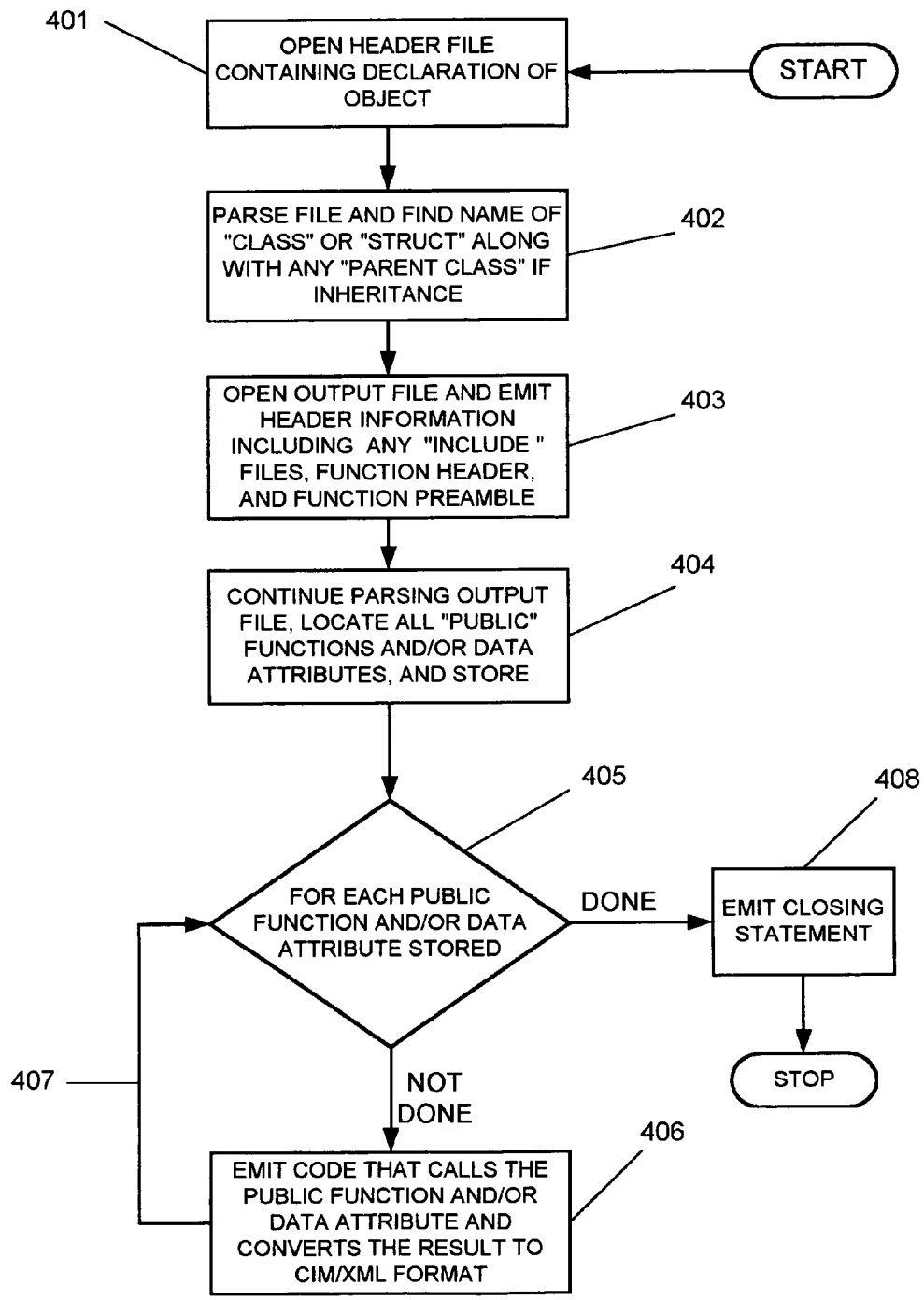
FIG. 4 is a flowchart depicting an algorithm performed by embodiments of the present invention; and, FIG. 5 is a flowchart depicting an algorithm performed by alternate embodiments of the present invention.

FIG. 4 is a flowchart depicting an algorithm performed by translator 300 utilized in certain embodiments of the present invention. The algorithm starts with step 401 opening a header file containing a declaration of an object. This header file contains information that needs to be converted into CIM/XML. In this step, the file is just being opened but not being parsed or looked at.

In the following specific illustrative example in Table I of an input to the translator, which is not to be considered as limiting the invention in any manner, such header file is equivalent to a RAID++ header file on bus 308 shown in FIG. 3. This particular input example is a header file that models a disk drive. The file is called "diskdevice.hxx", and the implementation is C++:

TABLE I

RAID ++ HEADER INPUT TO TRANSLATOR

```
#include "device.hxx"
class DiskDevice : public Device
{
    public:
        . . . . . . .
        boolean IsFaulted( ) const;
        char *GetVendorName( ) const;
        unsigned int GetBlocksRead( ) const;
        unsigned int GetBlocksWritten( ) const;
        . . . . . . .
};
```

As noted, this is an example of an input to translator 300 on bus 308. This class models a disk, and contain attributes such as whether or not the disk is experiencing a fault condition, what the name of the vendor was that built the disk, and how many blocks have been read and written to disk. Although this input is a class written in C++, it could have easily been a 'C' struct (in the "C" language which is not an object oriented language), a Pascal record, or a JAVA class.

Next, the algorithmic process moves to step 402 where the aforementioned header file input example is parsed until the declaration is found, i.e., until the name of "class" (or "struct" if it had been in "C") along with any "parent class" name, if there is inheritance, is found. In other words, each line of the header file in the above sample input is read-in to translator 300 up to the point that the declaration for the C++ class is discovered. The name of the C++ class is remembered. If the declaration contains an inheritance construct (in this case, the DiskDevice class inherits from Device), then the name of the parent class is recorded as well. Thus, for this example:

TABLE II

DECLARATION CONTAINS INHERITANCE CONSTRUCT

ClassName = "DiskDevice"
ParentClass = "Device"

Parsing means reading every line of code in the file and intelligently interpreting all syntax to get the accurate message out of each line of code. When the word "class" is found during such parsing, the next token or piece of information on that line is class name, and if a colon syntax is found that means "inheritance" where the next token after that is parent name. This methodology is understood by those skilled in C++ language.

Next the algorithmic process moves to step 403 where an output file is opened or created which is initially empty, and then a header is emitted into it. The header information includes "include" files, a function header and a function preamble. A principal purpose of translator 300 is to output source code that can be "called" to generate CIM/XML data for legacy objects written in various languages (C++ in this example). Thus, step 403 creates a new file, initially empty, that will eventually contain a subroutine or function (to be described) that will perform that generation of CIM/XML data. For illustrative purposes, consider that an output file is created with acronym "XML", which, in this example would be XMLdiskdevice.cxx. The translator will emit into this file an entire subroutine responsible for accepting a DiskDevice object and generating XML from it. In this example, if translator 300 receives the "diskdevice.hxx" input shown in Table I above the translator should generate an output in response to such particular input, which is block 301, and which can have the following detailed format in C++:

TABLE III

TRANSLATOR SOURCE CODE OUTPUT BASED ON TABLE I INPUT

```
#include "diskdrive.hxx"    // emit header file
// step B - emit parent class function footprint, if inheritance
extern void XMLGenerateDevice(Device &Device,
                              LinkedList<String> &XMLOutput,
                              LinkedList<String> &InheritTree,
                       String RequestedClass,
                              boolean LocalOnly,
                              boolean IncludeClassOrigin,
                              boolean DeepInheritance,
                              boolean IncludeQualifiers,
                              LinkedList<String> &PropertyList);
// step C - emit function header for class
void
XMLGenerateDiskDevice(DiskDevice &Disk,
                      LinkedList<String> &XMLOutput,
                      LinkedList<String> &InheritTree,
               String RequestedClass,
                      boolean LocalOnly,
                      boolean IncludeClassOrigin,
                      boolean DeepInheritance,
                      boolean IncludeQualifiers,
                      LinkedList<String> &PropertyList)
{
    // step D - if inheritance, call the XML generate routine for the parent
class
    XMLGenerateDevice(Disk, XMLOutput, InheritTree, RequestedClass,
LocalOnly,
               IncludeClassOrigin, DeepInheritance,
IncludeQualifiers, PropertyList);
    // step E - add the name of this class to the list that keeps track of
classes in the inheritance hierarchy
    InheritTree.append("DiskDevice");
    // step F - add an "if" clause to determine if any CIM/XML statements
should be output for this class
    If ((RequestedClass.compareTo("DiskDevice") == TRUE) ||
        ((InheritTree.contains(RequestedClass) == TRUE) &&
(DeepInheritance ==
TRUE)) ||
        (LocalOnly == FALSE))
    {
```

Translator 300 follows the following steps to generate the above output code, (where steps are labeled to match labels of output results in the above output example):

STEP A: Translator 300 generates an include statement that includes the output header file. In this case, the translator has opened the file "diskdevice.hxx", so that is the output that is emitted.

STEP B: If the translator detects inheritance it must generate an external function declaration that will be used inside the body of the subroutine. In this example, the translator knows that parent class is called "Device", and that the body of the subroutine will need to call XMLGenerateDevice. Thus, translator 300 declares the footprint of that routine. (All arguments declared in this external function declaration will be described in detail hereinbelow.)

STEP C: The actual subroutine for generating XML from the C++ DiskDevice class will now be emitted by translator 300. First the translator outputs a "void" statement, because the routine returns nothing. Next, what is output is the actual declaration of function: XMLGenerateDiskDevice, followed by arguments. A description of each argument and what it is needed for is as follows:

DiskDevice &Disk: This is the actual DiskDevice class that is going to be converted to CIM/XML LinkedList<String> &XMLOutput: This an empty list of strings that will be populated with the actual CIM/L information result.

LinkedList<String> &InheritTree: This is a list of strings that contains names of all classes that are parents of the current class. This list is initially empty but as each class gets called, name of class is filled in (see step E).

String RequestedClass: This string contains name of class that is being queried. It might be expected that in this example, it would always be "DiskDevice", but it is quite possible that DiskDevice is a parent of another class (say RamDiskDevice), and that the client wishes to query the "RamDiskDevice" subclass (which includes attributes from DiskDevice and Device).

NOTE: the following parameters are part of the incorporated-by-reference document relating to the DMTF specification for CIM Operations.

boolean LocalOnly: This parameter indicates whether or not the client wishes to view attributes that are just local to the requested class (LocalOnly equals TRUE), or additionally for any parent classes (LocalOnly=FALSE)

boolean IncludeClassOrigin: This boolean indicates whether or not a "CLASSORIGIN" attribute tag should be appended to each attribute within the object boolean DeepInheritance: This boolean indicates whether or not the client also wishes to view the attributes that are contained in child classes boolean IncludeQualifiers: This boolean indicates whether or not the client wishes to append qualifier tags to each attribute within the object LinkedList<String> &PropertyList: If this list is non-empty, it means the client wishes to only see certain attributes within an object, and not all of them.

STEP D: The code that the translator must next generate is a call to the parent class' GenerateXML routine (if there is a parent class). This insures that the parent class (and other classes above it in the inheritance hierarchy) get a chance to append its (and their) attributes respectively to the XMLOutput list if this is desired. This also gives parent classes a chance to add their names to the Inherit-Tree list (see the next step).

STEP E: As noted, the Inherit tree contains names of all parent classes in the inheritance hierarchy. In this step, the DiskDevice class simply adds its name to the list.

STEP F: This last step is a 3-part "if" statement that must be output by the translator. All of the native to CIM/XML conversion code exists within this "if" statement. The purpose of the "if" statement is to determine whether or not this CIM "object" should be converted. The three clauses are determining: (1) If the client is specifically asking for this class (e.g. "DiskDevice"). If so, then the "if" condition passes, or: (2) If the requested class is "above" the current class ("DiskDevice") in the inheritance hierarchy and DeepInheritance is set to TRUE. The way to determine if the requested class is "above" is whether or not the name has been added to the inheritance list previously. This is essentially equivalent to the client requesting the "Device" class and also obtaining information about subclasses. (3) If the client is not specifically asking for this class, and not asking for a parent class, then it must be asking for a subclass (below the current class) and if LocalOnly is set to FALSE, that means it is acceptable to convert information about parent classes. This is equivalent to asking for "RamDiskDevice", which is a subclass of "DiskDevice". Thus, translator 300 emits these three clauses and its process moves on to the next step.

Next, the algorithmic process moves to step 404 where the input header file from step 402 is continued to be parsed to locate certain or all "public functions" and/or "data attributes". Although step 404 in FIG. 4 is shown to locate all public functions and/or data attributes, under certain circumstances or in certain applications only a subset of all of them (certain selected ones of them) are desired. This step is where translator 300 actually begins looking for data items to convert to CIM/XML format. This could be in the form of public member functions such as those which would be found in C++ or Java, and/or public data items or attributes as those which would be found in C structs or Pascal records. Translator 300 must skip any protected or private routines/data, as well as constructors, destructors, operators, etc. Typically the translator would skip any complex routines that accept arguments. Also, translator 300 may or may not skip complex return types, such as other objects or structs. A method could be written however, to handle complex return types by converting the return value to CIM/XML. As the translator locates public functions and/or attributes, it stores two things: type and name. These elements are stored to be used as part of XML code generation. (As will be explained in connection with an alternative embodiment example illustrated in FIG. 5, such alternative embodiment does not store all information until it is finished locating certain or all public functions and/or attributes as does this embodiment illustrated in FIG. 4.) For the input/output example shown above in TABLE I and TABLE II, the translator would store the following 4 pairs:

1. Type=boolean, Name=IsFaulted
    2. Type=char *, Name=GetVendorName
    3. Type=unsigned int, Name=GetBlocksRead
    4. Type=unsigned int, Name=GetBlocksWritten Next, the algorithmic process moves to step 405 which is an iteration step to allow identification and processing of all type/name pairs. At this point the translator has parsed the entire input header file, and is now ready to generate code that converts data to CIM/XML format. Block 405 is just an iterator that starts on the $1^{st}$ pair in the preceding paragraph, (in this case "boolean/IsFaulted") and proceeds to step 406, until end of the list is reached whereupon the translator's algorithm proceeds to step 408.

Next, the algorithmic process moves to step 406 which emits code that calls each public function and/or data attribute and converts each result to CIM/XML format. In other words, the result of this translator 300 step emits source code into output file 301 that has capability (after compiling and linking in block 302, to be described further) to convert RAID++ data values (obtained via bus 304) into CIM/XML. A sample output based on the first pair in the description of step 405 hereinabove, namely the "IsFaulted" variable in the DiskDevice class is as follows:

TABLE IV

SAMPLE OUTPUT OF SOURCE CODE EMITTED BY TRANSLATOR 300 BASED ON IS FAULTED VARIABLE

```
// Step G - check the property list to see if this variable should be
converted
if ((PropertyList.isEmpty( ) == TRUE) ||
(PropertyList.contains("IsFaulted") == TRUE))
{
    // STEP H - make the call to get the data value
    boolean vIsFaulted = IsFaulted( );
```

TABLE IV-continued

SAMPLE OUTPUT OF SOURCE CODE EMITTED BY TRANSLATOR 300
BASED ON IS FAULTED VARIABLE

```
    // STEP I - begin PROPERTY tag
        String PropertyString = "<PROPERTY NAME=\"IsFaulted\"";
    // STEP J - include CLASS origin if desired
        if (IncludeClassOrigin == EV_TRUE)
        {
            PropertyString += " CLASSORIGIN=\"DiskDevice\" ";
        }
    // STEP K - end the property tag by including the type
        PropertyString += "TYPE=\"boolean\">";
    // STEP L - emit the property tag
        XMLStrings.append(PropertyString);
    // STEP M - create a string to store a string version of the boolean
        char BooleanValue[128];
        sprintf(BooleanValue, "%s",(vIsFaulted ? "TRUE" : "FALSE"));
    // STEP N - begin VALUE tag
    String ValueString = "<VALUE> + BooleanValue;
    // STEP O - end value tag and emit
    ValueString = ValueString + "</VALUE>";
    XMLStrings.append(ValueString);
    // STEP P - emit PROPERTY end tag and closing brace
    XMLStrings.append("</PROPERTY>");
}
```

Steps which the translator should use to generate the above output code is as follows (starting with letter "G" since the letter "F" was the last letter used to identify a prior step hereinabove):

STEP G: Create an "if" statement that tests whether or not the specific data value should be converted to CIM/XML. In essence, if a client wants to view "all" variables, the PropertyList will be empty and the body of the "if" statement is executed. Otherwise, the client wishes to view only a subset of all variables. Thus, a test to determine if the name of this variable is in the list is needed. In our example, if "IsFaulted" is in the list, then the body of the "if" statement is executed. It should be understood that the translator can emit name "IsFaulted" because it parsed that name out in a previous step.

STEP H: The next step is to actually get the data value that needs to be converted into CIM/XML. First, a variable needs to be declared to hold the result. Thus, the translator emits a variable declaration using the "type" it parsed out previously. It should be understood that the compiler may have to map the type from native language (whether it be int, boolean, char, etc.) into CIM basic data types, which are defined by DMTF. In this case the data type is boolean, and the variable name is simply the name of the subroutine prepended with a "v" for variable. Finally, the actual routine is called, which returns the value.

STEP I: A CIM/XML "PROPERTY" tag is generated. The PROPERTY tag is found in one of the incorporated by reference documents, the DMTF "Specification for CIM Operations over HTTP". In addition to the tag itself, the NAME attribute is present and it is set equal to the value of the item being returned ("IsFaulted").

STEP J: Before adding the closing brace of the property tag, the translator must generate an "if" statement which tests whether or not the client is asking for the "IncludeClassOrigin" attribute. If so, the body of the "if" statement appends a "CLASSORIGIN=" attribute to the current property string, and then adds the name of the class, which in this case is "DiskDevice". Note that the translator can optionally generate a similar "if" statement for the IncludeQualfiers boolean. In this example there are no qualifiers (the incorporated by reference CIM specification offers more detail).

STEP K: The last part of closing out the PROPERTY tag is to include an attribute which describes the type of the data value, using the "TYPE=" attribute statement. Once this is done (in this example it is a "boolean"), the final ">" can be added to close the opening PROPERTY tag statement.

STEP L: Now that the property tag is complete, the translator emits a statement that appends the property tag to the list of strings containing the C IM/L output. The translator could choose to emit it to a file, to a display, or in this case, a list of strings which will be processed later.

STEP M: In this step, the translator must take the return value generated in step H and convert it to a string. In order for the translator to do this, it must know what "type" is being returned, and this type is part of the information parsed in accordance with step 404. Based on type, a string is created and stored in a buffer. In this example, the boolean will result in CIM strings of "TRUE" or "FALSE". If the CIM data type was a number such as uint16 or uint32 it would be converted into a string and stored in the buffer.

STEP N: The value created in Step M needs to be embedded within a CIM <VALUE> tag, which is defined in the incorporated by reference CIM specification.

STEP O: The end tag (</VALUE>) is appended onto the string created in STEP N, and finally the translator generates a statement appending the value tag in its entirety onto the string list, again choosing to emit to a list of strings.

STEP P: Since the <VALUE> tag is embedded within a <PROPERTY> tag, the property tag needs to be closed with the </PROPERTY> keyword. The compiler emits this statement along with the closing brace that matches the "if" statement for STEP G.

Steps G through P are executed for each type-value pair by iterating via connection 407 (in our example above only four type-value pairs were shown, but it is to be understood that there can be a vast number of such pairs), whereupon code shall have been emitted which, after additional steps of compiling such source code into machine language, and linking such machine language with other machine language obtained from RAID++, shall form an executable that is capable of translating every acceptable value from the RAID++ object obtained via bidirectional bus 304 into CIM/XML. With respect to the specific example provided herein, what has thus been created is a server application that receives requests in the now-preferred and standard CIM/XML language, obtains objects in RAID++ (which is C++ object-oriented language, and this translator can operate with respect to any language, whether object-oriented or otherwise), and thereafter automatically provides appropriate responses to such requests in the preferred CIM/XML language!

Next, the algorithmic process moves to last step 408 wherein a closing statement is emitted. At this stage of the algorithmic process, translator 300 has generated source code for certain or all public functions and/or data attributes and it moves on to emit a closing brace matching the "if" statement emitted in step 403, STEP F, followed by a closing brace for step 403, Step C. In the output example under step 403 hereinabove and shown in TABLE III, a routine was generated called "XMLGenerateDiskDevice". A software application or program can now "call" (the "caller") this routine and pass the "DiskDevice" C++ class into it (along with all other parameters). In other words, a request, such as HTTP GET or some other appropriate input as shown associated with input bus 306 can be received by HTTP web server 303, which may buffer and process such request and forward the buffered and processed result (which could be a simple function call) to executable code 302 over bidirectional bus 305. Such result may be the "call" noted above, where the executable code responds as described herein.

And, upon completion of the routine, a CIM/XML code segment will be generated which, for an example, can take the following form:

TABLE V

CIM/XML CODE SEGMENT CORRESPONDING TO A PORTION OF COMPILED AND LINKED OUTPUT OF TABLE III SOURCE CODE

```
<PROPERTY NAME="IsFaulted" TYPE="boolean">
<VALUE>FALSE</VALUE>
</PROPERTY>
<PROPERTY NAME="GetVendorName" TYPE="string">
<VALUE>SEAGATE</VALUE>
</PROPERTY>
<PROPERTY NAME="GetBlocksRead " TYPE="uint32">
<VALUE>25639</VALUE>
</PROPERTY>
<PROPERTY NAME="GetBlocksWritten " TYPE="uint32">
<VALUE>2349</VALUE>
</PROPERTY>
```

This is not an example of an input to or an output from translator 300. This is not an example of an input to or output from source code for converting RAID++ to CIM/XML block 301. However, this is an example of a code segment written in XML/CIM language that ties-in with operation of compiled and linked executable 302 in connection with the prior output example in TABLE III but is, by itself, not a valid XML document. A valid XML document must have a root node and at least one child node. So the caller of the "XMLGenerateDiskDevice" routine must wrap this XML code with other statements, such as the following:

TABLE VI

CIM/XML CODE SEGMENT OF TABLE V WRAPPED IN APPROPRIATE HEADER AND TRAILER

```
<?xml version="1.0" ?>
<CIM CIMVERSION="2.0" DTDVERSION="2.0" >
    <MESSAGE ID="877" PROTOCOLVERSION="1.0" >
        <SIMPLERSP>
            <IMETHODRESPONSE NAME="EnumerateInstances" >
                <IRETURNVALUE>
                    <VALUENAMEDOBJECT>
                        <INSTANCE CLASSNAME="NAV_DiskDevice" >
                            <PROPERTY NAME="IsFaulted" TYPE="boolean">
                                <VALUE>FALSE</VALUE>
                            </PROPERTY>
                            <PROPERTY NAME="GetVendorName" TYPE="string">
                                <VALUE>SEAGATE</VALUE>
                            </PROPERTY>
                            <PROPERTY NAME="GetBlocksRead " TYPE="uint32">
                                <VALUE>25639</VALUE>
                            </PROPERTY>
                            <PROPERTY NAME="GetBlocksWritten " TYPE="uint32">
                                <VALUE>2349</VALUE>
                            </PROPERTY>
                        </INSTANCE>
                    </VALUE.NAMEDOBJECT>
                </IRETURNVALUE>
            </IMETHODRESPONSE>
        </SIMPLERSP>
    </MESSAGE>
</CIM>
```

Code appearing above the CIM/XML code segment (such segment shown in bold italics to clearly identify it) is called a header, and code appearing below the CIM/XML code segment is called a trailer. By wrapping the code segment within such header and trailer it then becomes usable by the caller. At this stage of operation of the present invention, the translator, the source code converter, and the executable code have cooperated with each other and any other hardware and software required to accomplish the principal task of automatically converting data values from a company's proprietary solution into an industry standard CIM/XML format.

Figure 5:
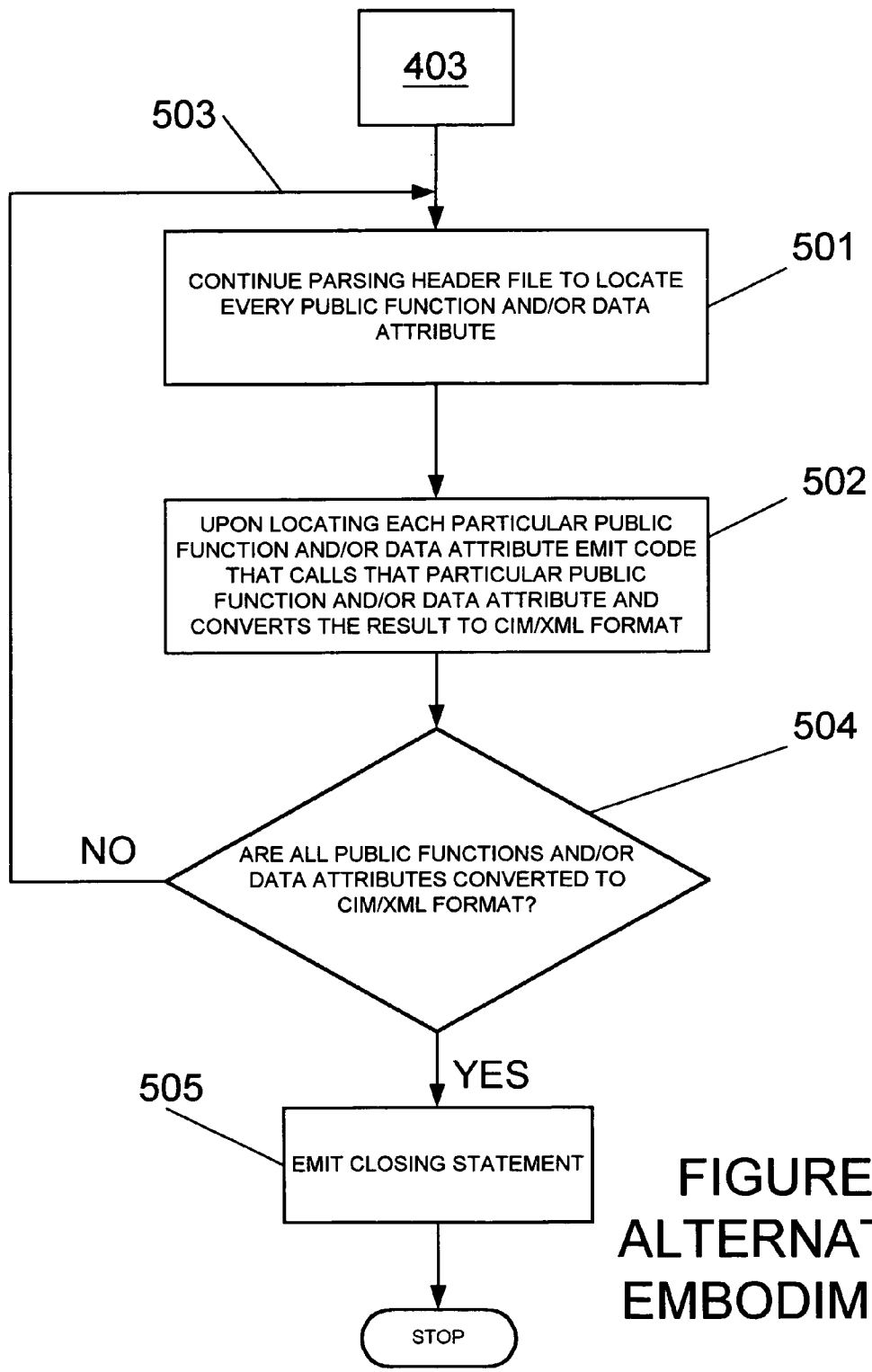

FIG. 5—Alternative Embodiment Flowchart

FIG. 5 is a flowchart depicting an algorithm performed by alternative embodiments of the present invention. The algorithm is identical to that of FIG. 4 through step 403. In step 501, parsing of the RAID++ header file in the aforementioned example continues in order to locate certain selected ones of every or every public function and/or data attribute. As noted in connection with discussion of FIG. 4, although every public function and/or data attribute is shown in step 501 in FIG. 5, under certain circumstances, or in certain applications, only a subset or certain ones of the entire group of public functions and/or data attributes are desired and, therefore, located and utilized. A major difference between this step and step 404 is that this step does not store information representing each located public function and/or data attribute, as was done with step 404. Accordingly, in step 502, upon locating a particular public function and/or data attribute, code is emitted that calls that particular public function and/or data attribute and converts the result to CIM/XML format. This is accomplished on a continuous and one-to-one basis in step 502, rather than, as performed in step 404, awaiting completion of locating certain or all public functions and/or data attributes each of which was stored until such completion, whereupon code was emitted in response to translating and otherwise processing all of them in seriatim but in a single conversion-to-CIM/XML step. Then, in decision step 504, the query is made: are certain or all public functions and/or data attributes converted to CIM/XML format? If not, the process is repeated as shown by connection 503 back to the input of step 501. If yes, the process moves to step 505 which emits a closing statement similar to that described above with FIG. 4, and the algorithm is done.

Embodiments of the present invention are to be considered in all respects as illustrative and not restrictive, and can be constructed in object oriented language (such as C++, JAVA, etc.) and non-object oriented language (such as C, for example). In other words, communication, including management software communication, in a preferred language (object-oriented or otherwise) between any first computer system or network employing such preferred language on the one hand, and any second computer system or network internally using a different or less-preferred computer language on the other hand, can be achieved easily and automatically by usage of embodiments constructed in accordance with principles of the present invention. There could even be circumstances under which both object-oriented and non-object-oriented languages used on separate systems operating at the same time are handled by embodiments utilizing principles of the present invention. Accordingly, the scope of the invention is indicated by the appended claims rather than by the foregoing description, and all changes which come within the meaning and range of equivalency of the claims are therefore intended to be embraced therein.

What is claimed is:

1. A computer system employing management software written in a first computer language compatible with legacy software architecture and not compatible with second software architecture, said system comprising:

a proprietary and non-standard schema formed within said legacy software architecture, said legacy software architecture being other than distributed management task force (DMTF) common information model (CIM) architecture;

header files contained within said schema, said header files being represented in said first language and capable of being utilized by said management software;

means for manipulating said header files to locate public functions and/or data attributes of said header files;

means, responsive to operation of said manipulating means, for emitting code that calls said public functions and/or data attributes in said first language to obtain called public functions and/or data attributes;

means for converting said called public functions and/or data attributes to representations of said called public functions and/or data attributes formed in a different computer language compatible with said second software architecture; and means for compiling said representations into machine language and linking said machine language with other machine-language corresponding to said header files to form an executable program that runs both machine languages together in accordance with both said second software architecture and said legacy software architecture to convert requests in accordance with said second software architecture into converted requests in accordance with said legacy software architecture and to re-convert obtained results in accordance with said legacy software architecture into re-converted results in accordance with said second software architecture.

2. The computer system of claim 1 further comprising means for forwarding said re-converted results to desired destinations within and beyond said system.

3. The computer system of claim 1 and wherein said first computer language is RAID++ and said different computer language is XML/CIM.

4. The computer system of claim 1 and wherein said first computer language is an object-oriented language defining computer data and commands as objects, said manipulating means comprising:

means for opening at least one of said header files containing a declaration of at least one of said objects;

means for parsing said at least one of said header files to obtain name of class and name of parent class to which said at least one of said objects belongs; and, means for creating a subroutine for accepting said at least one of said objects in said first computer language and generating the equivalent of said at least one of said objects in a different computer language compatible with said second software architecture.

5. The computer system of claim 1 further comprising means for inhibiting initiation of operation of said converting means until said public functions and/or data attributes of said header files are located.

6. The computer system of claim 1 further comprising means for initiating operation of said converting means upon locating the first of any one of said public functions and/or data attributes.

7. The computer system of claim 1 and wherein said first computer language is C++ and said different computer language is XML/CIM.

8. The computer system of claim 1 and wherein said first computer language is a first object-oriented language capable of pictorial representation typically in a parent-child tree configuration and said different computer language is a second object-oriented language capable of pictorial representation typically in a flat database configuration.

9. The computer system of claim 1 further comprising means for inhibiting initiation of operation of said converting means until said public functions and/or data attributes of at least one of said header files are located.

10. The computer system of claim 1 and wherein said management software is storage management software.

11. The computer system of claim 1 and wherein said management software is selected from the group consisting of storage, printer, and server management software.

12. A computer network employing a computer system utilizing management software written in a first computer language compatible with legacy software architecture and not compatible with second software architecture, said network comprising:

a proprietary and non-standard schema formed within said legacy software architecture, said legacy software architecture being other than distributed management task force (DMTF) common information model (CIM) architecture;

header files contained within said schema, said header files being represented in said first language and capable of being utilized by said management software;

apparatus for manipulating said header files to locate public functions and/or data attributes of said header files;

apparatus, responsive to operation of said manipulating apparatus, for emitting code that calls said public functions and/or data attributes in said first language to obtain called public functions and/or data attributes and that converts said called public functions and/or data attributes to representations of said called public functions and/or data attributes formed in a different computer language compatible with said second software architecture; and apparatus for compiling said representations into machine language and linking said machine language with other machine-language corresponding to said header files to form an executable program that runs both machine languages together in accordance with both said second software architecture and said legacy software architecture to convert requests in accordance with said second software architecture into converted requests in accordance with said legacy software architecture and to re-convert obtained results in accordance with said legacy software architecture into re-converted results in accordance with said second software architecture.

13. The network of claim 12 and wherein said computer system further comprises apparatus for forwarding said re-converted results to desired destinations within and outside of said network.

14. The network of claim 12 and wherein said first computer language is RAID++ and said different computer language is XML/CIM.

15. The network of claim 12 and wherein said first computer language is an object-oriented language defining computer data and commands as objects, said manipulating apparatus comprising:

apparatus for opening one of said header files containing a declaration of one of said objects;

apparatus for parsing said one of said header files to obtain name of class and name of parent class to which said one of said objects belongs; and, apparatus for creating a subroutine for accepting said one of said objects in said first computer language and generating the equivalent of said one of said objects in a different computer language compatible with said second software architecture.

16. The network of claim 12 further comprising apparatus for inhibiting initiation of operation of said converting apparatus until said public functions and/or data attributes of said header files are located.

17. The network of claim 12 further comprising apparatus for initiating operation of said converting apparatus upon locating the first of any one of said public functions and/or data attributes.

18. The network of claim 12 and wherein said first computer language is C++ and said different computer language is XML/CIM.

19. The network of claim 12 and wherein said first computer language is a first object-oriented language capable of pictorial representation typically in a parent-child tree configuration and said different computer language is a second object-oriented language capable of pictorial representation typically in a flat database configuration.

20. The network of claim 12 further comprising apparatus for inhibiting initiation of operation of said converting apparatus until said public functions and/or and data attributes of at least one of said header files are located.

21. The network of claim 12 further comprising a SAN which communicates with and is controlled by said computer system.

22. The network of claim 12 and wherein said management software is storage management software.

23. The network of claim 12 and wherein said management software is selected from the group consisting of storage, printer, and server management software.

24. A method for utilizing standardized software architecture to be practiced in a computer system employing management software written in a first computer language compatible with legacy software architecture and not compatible with said standardized software architecture, said method comprising:

said management software utilizing a proprietary and non-standard schema having header files in said first language, said schema formed within said legacy software architecture, said legacy software architecture being other than distributed management task force (DMTF) common information model (CIM) architecture;

manipulating said header files to locate public functions and/or data attributes of said header files;

responsive to operation of said manipulating, emitting code that calls said public functions and/or data attributes in said first language to obtain called public functions and/or data attributes and converts said called public functions and/or data attributes to representations of said called public functions and/or data attributes formed in a different computer language compatible with said standardized software architecture; and compiling said representations into machine language and linking said machine language with other machine-language corresponding to said header files to form an executable program that runs both machine languages together in accordance with both said standardized software architecture and said legacy software architecture to convert requests in accordance with said standardized software architecture into converted requests in accordance with said legacy software architecture and to re-convert obtained results in accordance with said legacy software architecture into re-converted results in accordance with said standardized software architecture.

25. The method of claim 24 further comprising forwarding said re-converted results to desired destinations within and beyond said system.

26. The method of claim 25 and wherein said first computer language is RAID++ and said different computer language is XML/CIM.

27. The method of claim 25 and wherein said first computer language is an object-oriented language defining computer data and commands as objects, said manipulating comprising:
  opening one of said header files containing a declaration of one of said objects;
  parsing said one of said header files to obtain name of class and name of parent class to which said one of said objects belongs; and,
  creating a subroutine for accepting said one of said objects in said first computer language and generating the equivalent of said one of said objects in a different computer language compatible with said standardized software architecture.

28. The method of claim 27 further comprising inhibiting initiation of operation of said converting until said public functions and/or data attributes of said header files are located.

29. The method of claim 28 further comprising initiating operation of said converting upon locating the first of any one of said public functions and/or data attributes.

30. The method of claim 29 and wherein said first computer language is C++ and said different computer language is XML/CIM.

31. The method of claim 27 and wherein said first computer language is a first object-oriented language capable of pictorial representation typically in a parent-child tree configuration and said different computer language is a second object-oriented language capable of pictorial representation typically in a flat database configuration.

32. The method of claim 24 further comprising inhibiting initiation of operation of said converting until said all public function and data attributes of at least one of said header files are located.

33. The method of claim 31 further comprising inhibiting initiation of operation of said converting until said public functions and/or and data attributes of at least one of said header files are located.

34. The method of claim 24 and wherein said standardized software architecture is preferred non-legacy software architecture.

35. The method of claim 24 and wherein said management software is storage management software.

36. The method of claim 24 and wherein said management software is selected from the group consisting of storage, printer, and server management software.

37. A computer program product including management software written in a first language and embodied in a computer system for operation on said computer system designed in accordance with legacy software architecture and not compatible with other than said legacy software architecture, said computer program product comprising:
  programmable code for utilizing a proprietary and non-standard schema having header files in said first language, said schema formed within said legacy software architecture, said legacy software architecture being other than distributed management task force (DMTF) common information model (CIM) architecture;
  programmable code for manipulating said header files to locate public functions and/or data attributes of said header files;
  programmable code, responsive to said manipulating, for emitting special code that calls said public functions and/or data attributes in said first language to obtain called public functions and/or data attributes and converts said called public functions and/or data attributes to representations of said called public functions and/or data attributes formed in a different computer language compatible with said other than said legacy software architecture; and
  programmable code for compiling said representations into machine language and linking said machine language with other machine-language corresponding to said header files to form an executable program that runs both machine languages together in accordance with both said other than said legacy software architecture and said legacy software architecture to convert request in accordance with said other than said legacy software architecture into converted request in accordance with said legacy software architecture and to re-convert obtained results in accordance with said legacy software architecture into re-converted results in accordance with said other than said legacy software architecture.

38. The computer program product of claim 37 further comprising programmable code for forwarding said re-converted results to desired destinations within and beyond said system.

39. The computer program product of claim 38 and wherein said first computer language is an object-oriented language defining computer data and commands as objects, said programmable code for manipulating comprising:
  programmable code for opening one of said header files containing a declaration of one of said objects;
  programmable code for parsing said one of said header files to obtain name of class and name of parent class to which said one of said objects belongs; and,
  programmable code for creating a subroutine for accepting said one of said objects in said first computer language and generating the equivalent of said one of said objects in a different computer language compatible with said other than said legacy software architecture.

40. The computer program product of claim 39 and wherein said first computer language is RAID++ and said different computer language is XML/CIM.

41. The computer program product of claim 40 further comprising programmable code for inhibiting initiation of operation of said programmable code for converting until said public functions and/or data attributes of said header files are located.

42. The computer program product of claim 40 further comprising programmable code for initiating operation of said programmable code for converting upon locating the first of any one of said public functions and/or data attributes.

43. The computer program product of claim 39 and wherein said first computer language is C++ and said different computer language is XML/CIM.

44. The computer program product of claim 37 and wherein said first computer language is a first object-oriented language capable of pictorial representation typically in a parent-child tree configuration and said different computer language is a second object-oriented language capable of pictorial representation typically in a flat database configuration.

45. The computer program product of claim 44 further comprising programmable code for inhibiting initiation of operation of said programmable code for converting until said public functions and/or and data attributes of at least one of said header files are located.

46. The computer program product of claim 37 and wherein said other than said first software architecture is preferred non-legacy software architecture.

47. The computer program product of claim 37 and wherein said management software is storage management software.

48. The computer program product of claim 37 and wherein said management software is selected from the group consisting of storage, printer, and server management software.

49. A computer program product compatible with preferred non-legacy software architectures and operating in a computer system employing management software written in a first computer language compatible with legacy software architecture and not compatible with said preferred non-legacy software architectures, said computer program product embodied in said system and comprising:
  programmable code for utilizing a proprietary and non-standard schema having header files in said first language compatible with said legacy software architecture, said legacy software architecture being other than distributed management task force (DTMF) common information model (CIM) architecture;
  programmable code for manipulating said header files to locate public functions and/or data attributes of said header files;
  programmable code, responsive to said manipulating, for emitting special code that calls said public functions and/or data attributes in said first language to obtain called public functions and/or data attributes;
  programmable code for converting said called public functions and/or data attributes to representations of said called public functions and/or data attributes formed in a plurality of different computer languages each being compatible with at least one of said preferred non-legacy software architectures; and
  programmable code for compiling said representations into machine language and linking said machine language with other machine-language corresponding to said header files to form an executable program that runs both machine languages together in accordance with both said preferred non-legacy software architectures and said legacy software architecture to convert requests in accordance with said preferred non-legacy software architectures into converted requests in accordance with said legacy software architecture and to re-convert obtained results in accordance with said legacy software architecture into re-converted results in accordance with said second preferred non-legacy architectures.

50. The computer program product of claim 49 and wherein said management software is storage management software.

51. The computer program product of claim 49 and wherein said management software is selected from the group consisting of storage, printer, and server management software.

52. In a computer network including a computer system having a functional system therein with management software, a translator-compiler embodied in said computer system, said translator-compiler comprising:
  program code for accessing header files within a proprietary and non-standard schema formed within legacy software architecture to obtain a header file containing particular information, said legacy software architecture being other than distributed management task force (DMTF) common information model (CIM) architecture;
  program code for parsing said header file to obtain a particular result;
  program code for opening an output file for storage of other than said particular information related to said particular result;
  program code for continued parsing of said header file to locate public functions and/or data attributes;
  program code for emitting special code to said output file that calls said public functions and/or data attributes to obtain called public functions and/or data attributes and for converting said called public functions and/or data attributes to representations of said called public function and or data attributes formed in a different language compatible with non-legacy software architecture; and
  program code for compiling said representations into machine language and linking said machine language with other machine-language corresponding to said header files to form an executable program that runs both machine languages together in accordance with both said non-legacy software architecture and said legacy software architecture to convert request in accordance with said non-legacy software architecture into converted request in accordance with said legacy software architecture and to re-convert obtained results in accordance with said legacy software architecture into re-converted results in accordance with said non-legacy software architecture.

53. In the computer network of claim 52 and wherein said functional system is a storage system and said management software is storage management software.

54. In the computer network of claim 52 and wherein said functional system is a SAN and said management software is SAN management software.

55. In the computer network of claim 52 and wherein said functional system is selected from the group consisting of storage system, printer system, server system or other-component system and said management software is selected from the group consisting of storage management software, printer management software, server management software and other-component management software respectively.

56. In the computer network of claim 52 and wherein said translator-compiler permits communication about managing said functional system to be transmitted between said computer system and computer devices operating under said non-legacy software architecture and located within said network.

57. In the computer network of claim 52 and wherein said translator-compiler permits communication about managing said functional system to be transmitted between said computer system and computer devices operating under said non-legacy software architecture and located outside of said network.

58. A method to be practiced on a computer system in a computer network including a functional system controlled by said computer system compatible with legacy software architecture having header files, said method comprising:

receiving and manipulating said header files in a manner to call public functions and/or data attributes of said header files in computer language compatible with said legacy software architecture and to convert said called public functions and/or said data attributes to representations thereof in a different computer language compatible with non-legacy software architecture;

compiling said representations into machine language and linking said machine language with other machine-language corresponding to said header files to form an executable program that runs both machine languages together in accordance with both said non-legacy software architecture and said legacy software architecture to convert requests in accordance with said non-legacy software architecture into converted requests in accordance with said legacy software architecture and to re-convert obtained results in accordance with said legacy software architecture into re-converted results in accordance with said non-legacy software architecture; and communicating said re-converted results in accordance with said non-legacy software architecture to the destination from which, or to destinations related to that from which, said requests originated.

59. The method of claim 58 and wherein said functional system is a storage system.

60. The method claim 58 and wherein said functional system is a SAN.

61. The method of claim 58 and wherein said requests are received from outside of said network.

62. In a computer system compatible with legacy software architecture, management software embodied in said computer system for controlling at least one processor in said system to perform a method of responding to requests, said method comprising:

calling public functions and/or data attributes in computer language compatible with said legacy software architecture and converting said called public functions and/or said data attributes to representations thereof in a different computer language compatible with non-legacy software architecture;

compiling said representations into machine language and linking said machine language with other machine-language corresponding to said called public functions and/or said data attributes to form an executable program that runs both machine languages together in accordance with both said non-legacy software architecture and said legacy software architecture to convert requests in accordance with said non-legacy software architecture into converted requests in accordance with said legacy software architecture and to re-convert obtained results in accordance with said legacy software architecture into re-converted results in accordance with said non-legacy software architecture; and communicating said re-converted results in accordance with said non-legacy software architecture to the destination from which, or to destinations related to that from which, said requests originated.

63. In the computer system of claim 62 and wherein said management software is storage management software.

64. In the computer system of claim 62 and wherein said management software is SAN management software.

65. In the computer system of claim 64 and wherein said destination is located outside of said computer system.

66. A computer program product embodied in a computer compatible with legacy software architecture comprising:

programmable code for calling public functions and/or data attributes in computer language compatible with said legacy software architecture and converting said called public functions and/or said data attributes to representations thereof in a different computer language compatible with non-legacy software architecture;

programmable code for compiling said representations into machine language and linking said machine language with other machine-language corresponding to said called public functions and/or said data attributes to form an executable program that runs both machine languages together in accordance with both said non-legacy software architecture and said legacy software architecture to convert requests in accordance with said non-legacy software architecture into converted requests in accordance with said legacy software architecture and to re-convert obtained results in accordance with said legacy software architecture into re-converted results in accordance with said non-legacy software architecture; and programmable code for communicating said re-converted results in accordance with said non-legacy software architecture to the destination from which, or to destinations related to that from which, said requests originated.

67. A method for managing functional systems to be practiced on a computer compatible with legacy software architecture comprising:

receiving requests in first language incompatible with said legacy software architecture, said legacy software architecture being other than distributed management task force (DMTF) common information (CIM) architecture;

calling public functions and/or data attributes in computer language compatible with said legacy software architecture and converting said called public functions and/or said data attributes to representations thereof in a different computer language compatible with non-legacy software architecture;

compiling said representations into machine language and linking said machine language with other machine-language corresponding to said called public functions and/or said data attributes to form an executable program that runs both machine languages together in accordance with both said non-legacy software architecture and said legacy software architecture to convert request in accordance with said non-legacy software architecture into converted requests in accordance with said legacy software architecture and to re-convert obtained results in accordance with said legacy software architecture into re-converted results in accordance with said non-legacy software architecture; and communicating said re-converted results in accordance with said non-legacy software architecture to the destination from which, or to destinations related to that from which, said requests originated.

68. The method of claim 67 and wherein said functional systems include a storage system.

69. The method of claim 67 and wherein said functional systems include a SAN.

70. The method of claim 67 and wherein said functional systems are selected from the group consisting of storage systems, printer systems, and server systems.

71. In a computer network including a computer system and a storage system controlled by said computer system, a method for managing storage compatible with legacy software architecture having header files, said method being deployed on both said computer system and said storage system, said method comprising:

translating and manipulating said header files in a manner to call public functions and/or data attributes of said header files in computer language compatible with said legacy software architecture and to convert said called public functions and/or said data attributes to representations thereof in a different computer language compatible with non-legacy software architecture;

receiving first requests from outside of said network in first language incompatible with said legacy software architecture, said legacy software architecture being other than distributed management task force (DMTF) common information model (CIM) architecture;

compiling said representations into machine language and linking said machine language with other machine-language corresponding to said header files to form an executable program that runs both machine languages together in accordance with both said non-legacy software architecture and said legacy software architecture to convert said first requests in accordance with said non-legacy software architecture into converted requests in accordance with said legacy software architecture and to re-convert obtained results in accordance with said legacy software architecture into re-converted results in accordance with said non-legacy software architecture.

72. In the computer network of claim 71 further comprising said storage system is a SAN.

73. In the computer network of claim 71 and wherein said first language is a first object-oriented language capable of pictorial representation typically in a flat database configuration and said second language is a second object-oriented language capable of pictorial representation typically in a parent-child tree configuration.

74. In the computer network of claim 73 and wherein said first language is CIM/XML and said second language is C++.

75. In the computer network of claim 74 and wherein said C++ language is RAID++.

76. In an improved network including a first computer network operating in accordance with legacy software architecture and a second computer network operating in accordance with non-legacy software architecture, said legacy software architecture being other than distributed management task force (DMTF) common information model (CIM) architecture, the improvement comprising:

an interface between said first computer network and said second computer network comprising an executable program formed from a binary derived from said legacy software architecture linked with a binary derived from said non-legacy software architecture, said linked binaries running together in said executable program on a processor in accordance with both said non-legacy software architecture and said legacy software architecture to automatically convert communication from said second computer network into a form compatible with said first computer network, and to automatically convert response to said communication generated by said first computer network into a form compatible with said second computer network;

whereby a user of said second computer network operating in accordance with said non-legacy software architecture automatically communicates with said first computer network operating in accordance with said legacy software architecture.

77. The improvement of claim 76 and wherein said first computer network operates in accordance with said legacy software architecture supporting a first object-oriented computer language capable of pictorial representation typically in a parent-child tree configuration, and wherein said second computer network operates in accordance with said non-legacy software architecture supporting a second object-oriented computer language capable of pictorial representation typically in a flat database configuration.

78. The improvement of claim 77 and wherein said first object-oriented computer language is C++ and wherein said second object-oriented computer language is XML/CIM.

79. The improvement of claim 78 and wherein said communication includes management software communication.

80. The improvement of claim 79 and wherein said management software communication includes storage management software communication.

81. The improvement of claim 80 and wherein said storage management software communication relates to SAN communication.

82. The improvement of claim 79 and wherein said management software communication includes storage, printer, and server communications.

83. The improvement of claim 76 and wherein said response is communicated to the destination from which, or to destinations related to that from which, said communication originated.

* * * * *